United States Patent [19]

Bonjour et al.

[11] Patent Number: 4,963,222

[45] Date of Patent: Oct. 16, 1990

[54] INSTALLATION FOR MANUFACTURE OF MULTI-STRAND ELECTRIC CABLE

[75] Inventors: Jacques L. Bonjour, Epalinges; Dan G. Baz, Ecublens, both of Switzerland

[73] Assignee: Maillefer S.A., Ecublens, Switzerland

[21] Appl. No.: 319,703

[22] Filed: Mar. 7, 1989

Related U.S. Application Data

[62] Division of Ser. No. 130,633, Dec. 9, 1987, Pat. No. 4,837,405.

[30] Foreign Application Priority Data

Dec. 18, 1986 [CH] Switzerland ........................ 5052/87

[51] Int. Cl.[5] ........................ B32B 31/08; H01B 13/02

[52] U.S. Cl. ........................ 156/393; 156/51; 156/55; 156/423; 156/499; 156/519; 174/34; 174/36; 174/112; 174/113 R; 174/115; 174/117 F

[58] Field of Search ........................ 156/47, 51, 55, 393, 156/423, 519, 499; 174/34, 36, 112, 113 R, 115, 117 F

[56] References Cited

U.S. PATENT DOCUMENTS

| | | | |
|---|---|---|---|
| 4,034,148 | 7/1977 | Lang | 174/34 |
| 4,359,597 | 11/1982 | Paquin | 174/34 |
| 4,381,208 | 4/1983 | Baverstock | 156/52 |
| 4,408,443 | 10/1983 | Brown et al. | 174/34 X |
| 4,443,277 | 4/1984 | Rokas | 156/50 |
| 4,461,923 | 7/1984 | Bogese, II | 174/36 |
| 4,697,051 | 9/1987 | Beggs et al. | 174/34 X |
| 4,767,891 | 8/1988 | Biegon et al. | 174/34 |

FOREIGN PATENT DOCUMENTS

| | | | |
|---|---|---|---|
| 2709129 | 8/1978 | Fed. Rep. of Germany | 174/34 |
| 2715585 | 10/1978 | Fed. Rep. of Germany | 174/117 F |
| 20578 | 2/1978 | Japan . | |
| 1432548 | 4/1976 | United Kingdom . | |

*Primary Examiner*—Robert A. Dawson
*Attorney, Agent, or Firm*—Oliff & Berridge

[57] ABSTRACT

The cable is made up of a series of pairs stranded alternately in one direction and the other. At the locations of the reversal of the stranding direction, the individual conductors are kept in the form of a web and welded together side by side. Between two thus bonded segments, the adjacent pairs are twisted in opposite directions. A ground wire is provided with lengths of sheathing which come to be placed in the bonded segments. These segments are marked by deposition of a radioactive substance or other indicator material detectable during a subsequent stage of manufacture and actuating marking. Once overall stranding and jacketing have taken place, or during those stages, the bonded segments are spotted owing to the indicator substance and are marked visibly.

8 Claims, 11 Drawing Sheets

INSTALLATION FOR MANUFACTURE OF MULTI-STRAND ELECTRIC CABLE

This is a Division of application Ser. No. 07/130,633 filed Dec. 9, 1987 and now U.S. Pat. No. 4,837,405.

BACKGROUND AND SUMMARY OF THE INVENTION

This invention relates to electric cable of the type having an assembly of individual conductors, each provided with an insulating sheath, and an overall covering, as well as to a method of manufacturing such cable and an installation for carrying out the method.

Electric cable is customarily made up of a group of insulated wires stranded to form a bunch covered with a jacket. The general cross-section of the cable is circular. In certain cases, the cable comprises a central core of fibrous material, about which the insulated wires are stranded. The group of wires may also be made up of several strands, e.g., of pairs or of quads, which are subjected to a main stranding operation prior to jacketing. If the cable comprises a non-metallic core, it is more flexible and also has greater resistance to tensile stress than cable having a cross-section completely taken up by wires.

Used particularly in the control of devices and machines is flat cable in which the insulated wires are disposed in ribbon form and run parallel to one another. In general, bare wires are embedded in an outer ribbon-like sheath which keeps the wires parallel. The great advatage of this form of cable is that it is easy to find the two ends of any one wire in a length of cable to be connected at both ends, say, between a control device and a machine controlled by the device. In the ribbon which forms flat cable, the different wires are actually placed in a predetermined order. However, flat cable has several drawbacks: it is awkward and often difficult to position within the frame of a machine, in a corner or along an inner ridge between two wall panels. Moreover, the manufacture of shielded flat cable presents major difficulties. Finally, the cost-price of presently available flat cable is higher than for cable having the same characteristics but with conductors bunched and surrounded by a cylindrical jacket.

It is an object of this invention to provide an improved cable which can be cut into any desired lengths, having a structure similar to that of bunched cable but offering the same advantages as flat cable.

A further object of the invention is to provide a method and installation for producing such cable economically.

To this end, the cable according to the present invention, of the type intially mentioned, is formed of successive segments alternately grouped and joined, i.e., in which the conductors respectively present a bunched arrangement and a web arrangement of parallel elements, their sheaths then being joined to one another in a predetermined order over the entire length of these segments so as to permit an IDC.

In the manufacturing method according to the present invention, the individual conductors are unreeled in a web of parallel elements, these individual conductors are stranded alternatingly by groups, each comprising a small number of conductors, the conductors are replaced upon each reversal of the stranding direction in a web arrangement of parallel elements, and the sheaths of the conductors of the web are then joined side by side in such a way as to fix the stranding of the grouped segments, on the one hand, and to constitute the joined segments, on the other hand.

Finally, the installation according to the present invention for carrying out the foregoing method comprises, in a production line, a payout reel for unreeling a web of insulated conductors, a set of two stranding units having parallel axes, a bonding station equipped with several guiding and clamping devices, and a main stranding device situated downstream from the bonding station.

BRIEF DESCRIPTION OF THE DRAWINGS

A preferred embodiment of the invention will now be described in detail with reference to the accompanying drawings, in which.

DETAILED DESCRIPTION OF THE PREFERRED EMBODIMENTS

Figure 12:
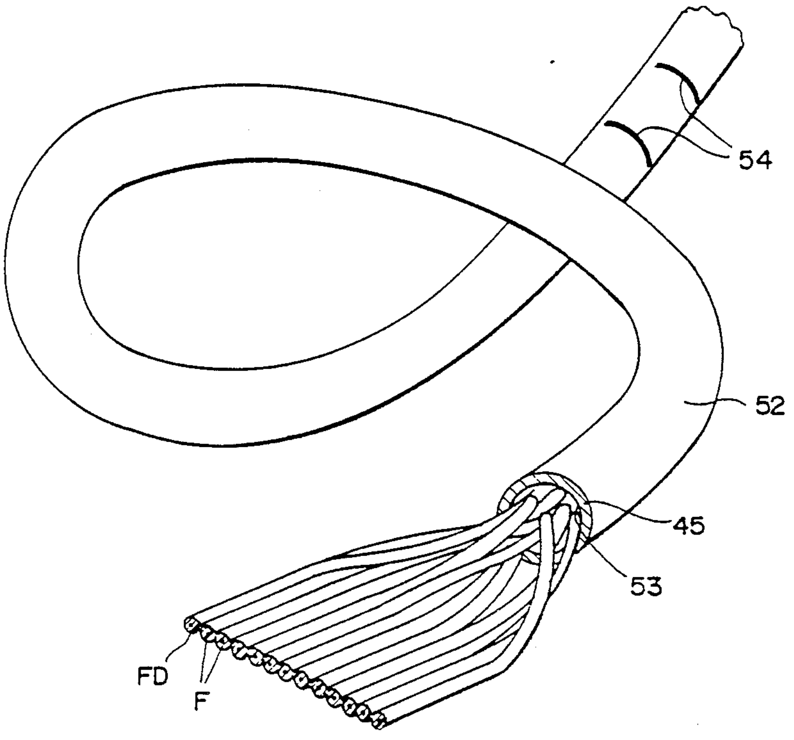
FIG. 12 is a perspective view of a length of cable produced by the method according to the invention.

The installation to be described permits manufacture of cable according to the present invention, and more particularly cable formed of a succession of grouped segments and bonded segments, the whole being surrounded by a continuous covering of plastic which forms the jacket of the cable and is of cylindrical cross-section. Along the grouped segments, the individual conductors forming the cable are stranded, whereas in the bonded segments, the sheaths of these conductors are bonded to one another in a web of parallel conductors placed in a predetermined order, so that it is easy to spot within the web a certain conductor intended to be connected to particular devices. Hence this arrangement answers the requirements of the so-called IDC (insulation displacement connection). These zones where the conductors are bonded in webs may be spotted in the finished cable by means of markings made on the jacket at those locations. Thus, it is easy to cut the cable at the location where the conductors are bonded. After the cut end has been stripped, the bonded zone- —normally doubled back on itself within the jacket—can be spread out in a flat web as shown in FIG. 12.

Before the installation is described, it should be noted that along the grouped segments, the individual conductors may be stranded in different ways. In the embodiment to be described, the conductors are first stranded in pairs according to the alternating stranding method, i.e., the twisting direction of the conductors is reversed from one grouped segment to the next. Moreover, in the web of conductors, the successive pairs are stranded in alternate directions. Finally, the assembly of pairs is itself stranded before jacketing takes place. However, the arrangement by pairs is not obligatory. The individual conductors may also be introduced separately in the jacket. Quads or other groupings of conductors may equally well be provided instead of pairs. The conductors themselves are, for example, wires or strands of copper or aluminum of a diameter on the order of 1 mm or less, covered with a sheath, preferably of plastic material.

Figure 1:
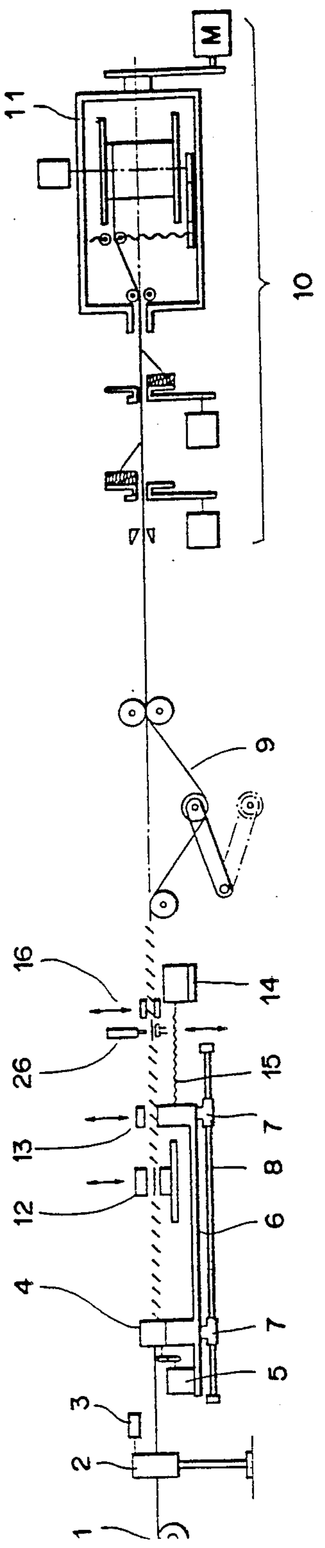
FIG. 1 is a diagrammatic elevation showing the main stations of part of an installation for manufacturing the cable.

FIG. 1 shows diagrammatically, on a small scale, the group of mechanisms which carry out the main stages of manufacture of the cable, without the final jacketing and marking. The individual conductors leave a group of payout reels 1 situated at the left-hand side of FIG. 1 and comprising the required number of reels, each bearing an insulated conductor. These conductors are paid out parallel in the form of a web. The first mechanism encountered by the individual conductors is an upstream multiple pairer 2 driven by a reversible motor 3 and in step with a downstream pairer 4. Next the conductors encounter downstream multiple pairer 4, which is driven by a reversible motor 5. Taking the individual conductors by two's pairer 4 forms a series of pairs, e.g., eight or ten pairs, or more depending upon the application.

Multiple pairer 4 is installed on a mobile carriage 6 borne by slides 7 on two pairs of parallel guide bars 8 which are longer than the grouped segments will be in the finished cable. Upstream stranding unit 2 co-operates with unit 4. It is fixed at the exit of payout reels 1 of the individual conductors. These are regrouped in pairs corresponding to the pairs of the downstream unit 4. Unit 2 strands in step with and in the opposite direction from downstream unit 4, making it possible for the latter to move while still maintaining a web of parallel conductors at the exit of payout reels 1. At the right-hand end, as viewed in the drawing, of the path travelled by carriage 6, there is a marking device 26 which, as will be seen below, deposits on the bonded segments a marking substance by means of which the location of the bonded segments can be detected after jacketing of the cable. The device situated downstream from carriage 6 is a withdrawal mechanism provided with an equalizer 9, e.g., a pantograph-type equalizer. The web of individual conductors is intermittently pulled downstream by carriage 6 so that equalizer 9 acts as a regulator for the continuous feed of the mechanisms situated downstream. The next of these mechanisms downstream from equalizer 9 is a main strander 10 capable of stranding the assembly of individual conductors, also in the zones where they form bonded segments and are consequently welded to one another.

Associated with strander 10 are a die and two covering devices which envelop the cable with thread. These devices are conventional and need not be described. Here they represent one example among others. A reel 11 upon which the cable is wound is transferred and utilized again in connection with the jacketing of the cable, followed by an outside marking operation, controlled by a sensor capable of detecting the location of the bonded segments which are provided with a tagging substance.

In the event that the cable is to be shielded, that operation may take place either after the textile covering or at the time reels 11 are transferred, prior to jacketing.

Carriage 6 reciprocates over a distance corresponding to the length of the segments in which the individual conductors are stranded in pairs, forming separate parallel strands. These segments will hereafter be called "grouped segments." Each intermediate segment between two successive grouped segments constitutes what shall be called a "bonded segment," in which the individual conductors are disposed in a plane web of parallel conductors, the sheaths of which are bonded to one another. The sheath-bonding operation is carried out at a bonding station 12, comprising guiding and holding means and welding means. As may be seen in FIG. 1, carriage 6 comprises at its front or downstream end a clamp 13 and at its rearward or upstream end the downstream stranding unit 4. By means of a reversible motor 14 and a drive screw 15, carriage 6 is moved alternately forward and back. Upon the forward movement, clamp 13 is closed on the web, which is thereby carried along and introduced into equalizer 9. At the end of this movement, a fixed clamp 16 is closed on the web, and clamp 13 is opened. Carriage 6 then reverses in several steps, as will be explained below, so that firstly, the horizontal web which forms a bonded segment is suitably positioned in welding station 12, and secondly, once welding has taken place, pairer 4 goes into operation and strands the pairs while moving backward.

Figures 2, 3:
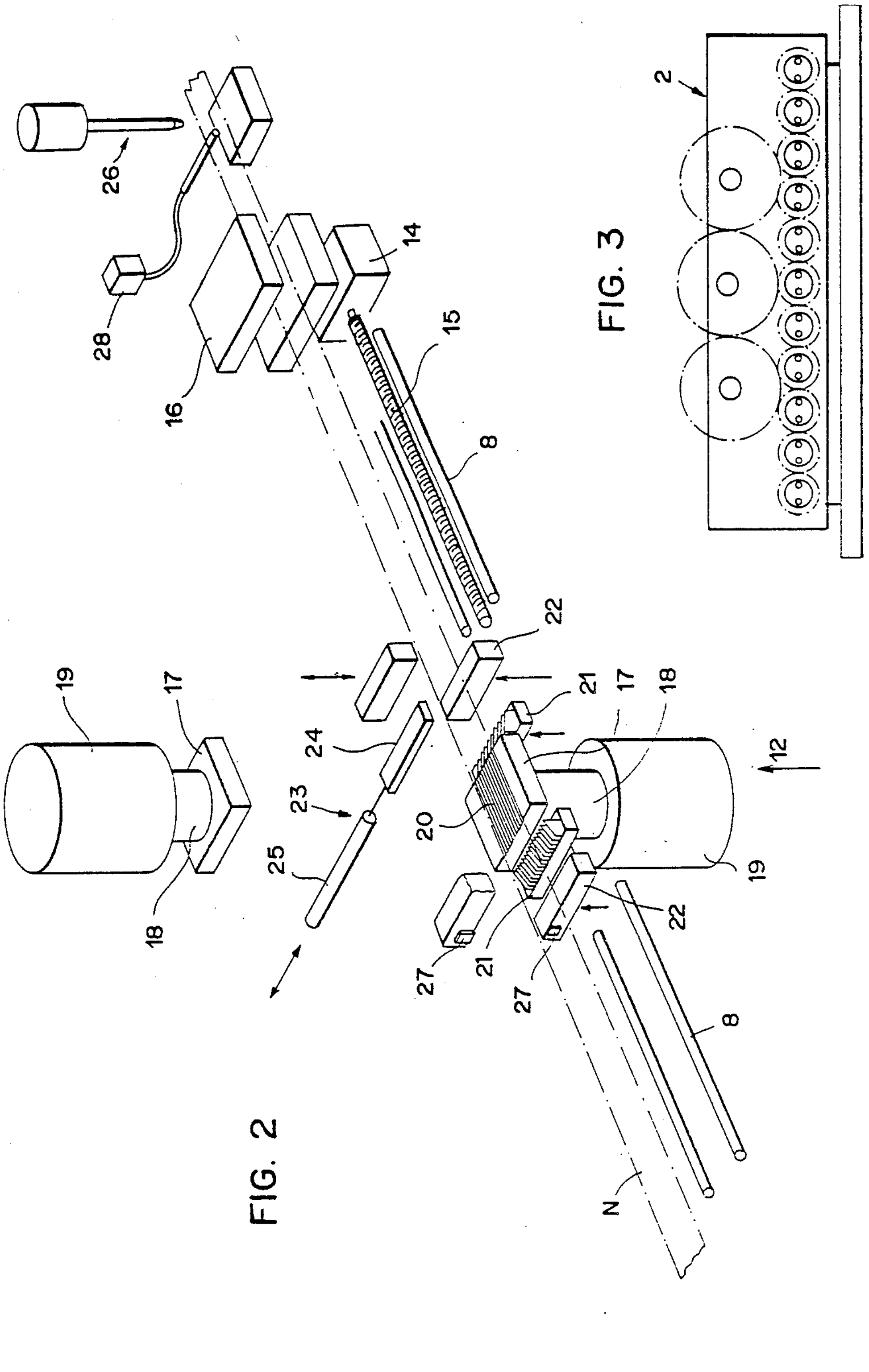
FIG. 2 is a simplified, diagrammatic, and partial exploded perspective view of an embodiment of the installation.
FIG. 3 is an end-on elevation of the upstream stranding unit mounted on the distributor of the payout reel for the individual conductors.

In FIG. 2, various elements forming part of the stationary mechanisms of the production line are depicted diagrammatically. Shown at the left-hand side of this drawing are a number of insulated metal conductors, especially copper wires or strands about 1 mm in diameter, for example. This web N of copper wires or strands may include any number of conductors; but in the example being described, a web made up of 11 pairs—in other words, 22 wires—(see FIG. 3), plus the grounding, will be considered. Downstream there is a first pair of guide rails 8 which are interrupted to make room for bonding station 12, beyond which guide rails 8 continue, supporting the downstream end of carriage 6 (not shown in FIG. 2). Also depicted are screw 15 for driving carriage 6, geared motor 14 for driving screw 15, and stationary clamp 16, the two jaws of which are movable vertically and controlled by jacks. Bonding station 12 comprises two opposing plates 17 downstream. Each of the plates 17 is supported by a jack rod 18 and controlled by a cylinder 19. Plates 17 move vertically up and down. Lower plate 17 is provided with a row of parallel grooves 20, the diameter of which corresponds to that of the insulation on the wires of web N, so that during the welding operation, each of these wires fits into one of these grooves 20. As will be mentioned again below, there is a row of heating rods embedded in upper plate 17 of bonding station 12, so that when the two plates 17 are pressed against one another, the insulating sheaths of the segments of wire between these plates are heated and welded together (cf. FIG. 10). Lower plate 17 may comprise a cooling circuit to hasten cooling of the welds after bonding. Disposed in front and in back of lower welding plate 17 are two parallel combs 21, the teeth of which are formed by narrow metal strips. Combs 21 are likewise mounted on jack rods and can be actuated vertically so as to be raised or lowered during operation of the device, as will be seen below. Respectively disposed upstream and downstream from combs 21 are two clamps 22, each comprising an upper and a lower cross-bar, these two bars also being controlled by means of a rod assembly (not shown) so as to be raised and lowered and to clamp the web between them. On the downstream side, clamp 22 is further associated with an interposed device 23 comprising a transverse blade 24 mounted on the rod of a jack 25. The function of blade 24 will be explained below.

Each of the two elements of the upstream clamp 22 bears a knife 27 intended for cutting the insulation of the grounding. Knives 27 act at the time of the welding operation and cut the insulation to the length provided for the insulated ground segment associated with the bonded segments.

Finally, FIG. 2 also shows an interior marking device 26 disposed immediately downstream from clamp 16. This device comprises a fixed base situated just beneath web N and, above this base, a duct fed from a container having a control valve so that at the proper moment, a drop of the liquid in the container can be deposited on the web at the location of device 26. This liquid is one in which a short-lived radioactive substance is dissolved. A device 28 having a hot-air jet expedites the deposition of the radioactive compound. As a modification, it would be possible to use a dye or any other product capable of causing an emission which, after formation of the cable, passes through its jacket so as to permit detection of the location thus marked on the inside during manufacture of the cable.

Figure 5:
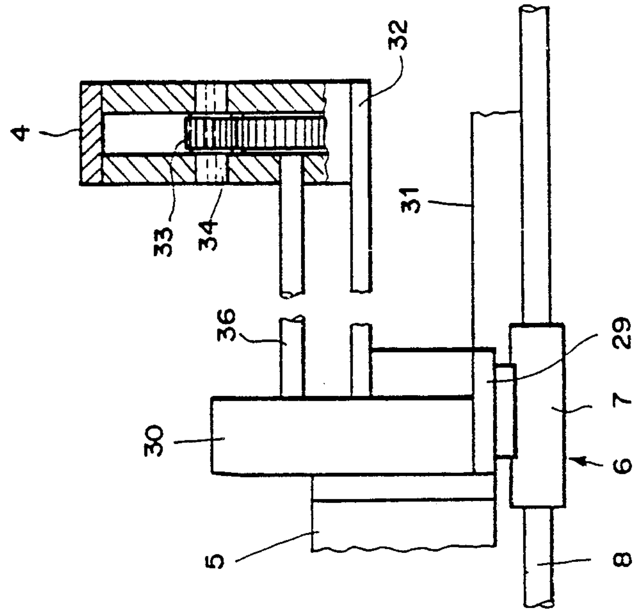
FIG. 5 is an elevation of the downstream unit partially in section taken on the line V—V of FIG. 4, FIGS. 6A–E are diagrammatic elevations showing different steps of the manufacturing process.
Figure 4:
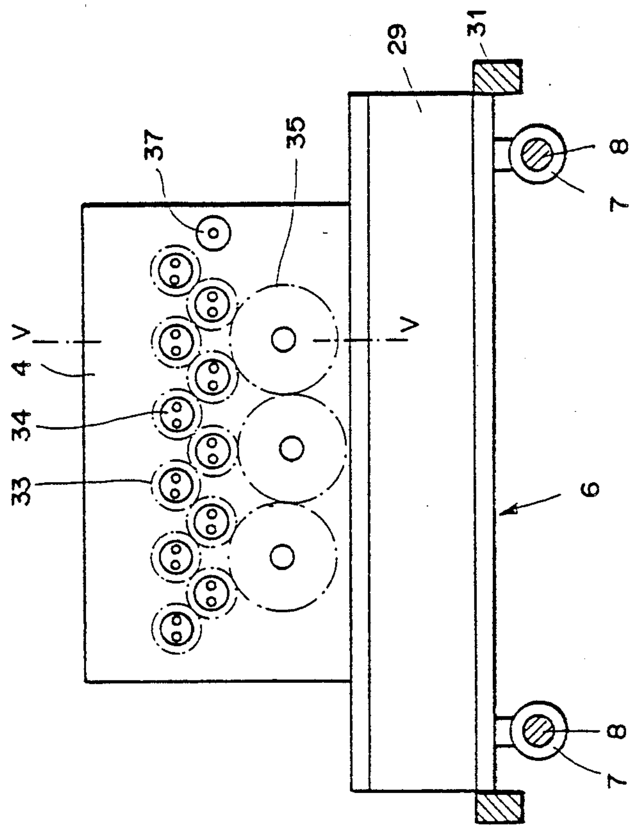
FIG. 4 is an end-on elevation of the downstream stranding unit mounted on the carriage.

FIGS. 4 and 5 illustrates in more detail the parts of carriage 6 constituting the multiple pairer. These drawing figures show rails 8, slides 7, downstream stranding unit 4, and drive motor 5. Stranding unit 4 is cantilevered toward downstream over a relatively great distance with respect to a base 29 to which slides 7, a reduction gear 30, and the frame of motor 5 are fixed. Base 29 bearing unit 4 and the support base of clamp 13 are connected from one end of carriage 6 to the other by longitudinal bars 31. Clamp 13 is situated downstream from bonding station 12. Unit 4 is placed at the downstream end of a plate 32 which is cantilevered from base 29 so that it can fit into bonding station 12 when carriage 6 moves toward its downstream position, as will be seen below. The structure of pairing unit 4 may be seen in FIGS. 4 and 5. This unit is a rigid frame containing the required number—eleven, in this case—of rotating heads 33, each comprising a shaft section having two parallel longitudinal bores 34 and, in the center part of the head, driving teeth. Rotating heads 33 are supported in the frame of unit 4 so as to rotate about parallel axes disposed in two rows at different levels. The toothed disks of heads 33 intermesh by two's and engage the elements of a gear train 35, one of the elements of which is connected by a shaft 36 to the output shaft of reduction gear 30 driven by motor 5. The design is such that two adjacent heads 33 rotate in opposite directions. The center distance of the axes projected on the horizontal plane corresponds to that of grooves 20 of bonding plate 17. Motor 5 is connected to a control device so as to be alternately started and stopped as a function of the different steps of the manufacturing process, each stranding operation taking place with a reversal of the direction of rotation of the motor.

A passage 37 serving to guide a ground wire should also be noted in FIG. 4.

The operation of the production line, and of mechanisms 6 and 12 in particular, is illustrated in FIG. 6, which shows diagrammatically the disposition of the installation during five stages of the operation. FIG. 6A shows the starting position after web N as a whole has advanced one step. A bonded segment of cable faces interior marking device 26, and the upstream end of the preceding grouped segment is situated between the jaws of clamp 16. Carriage 6 with, in particular, the frame of pairer 4, is situated in its downstream end position, where it may be seen that the downstream face of pairer 4 is adjacent to downstream clamp 22. Web N has been pulled into the position it occupies in FIG. 6A by the movement of carriage 6, clamp 13 being closed on the web. The web of wires stranded in pairs is divided into two partial webs, the wires of one of these partial webs passing into the bores 34 of the stranding heads 33 of the upper row, while the other conductors pass into the bores 34 of the heads 33 of the lower row. Thus there exists between the two partial webs a space which corresponds to the difference in height between the axes of the two rows of heads 33, and this space is situated exactly at the level of the interposed blade 24 which, in the position shown, is still retracted within jack cylinder 25. The first operation taking place at that moment is the closing of clamp 16, as is seen in FIG. 6B, and the opening of clamp 13. At the same time, jack 23 associated with interposed blade 24 is actuated, and blade 24 enters between the two partial webs of stranded wires. Motor 14 is started up, whereby screw 15 causes carriage 6 to return a short distance upstream so that two partial webs of straight, parallel wires start to form upstream from clamp 22, which was closed immediately before the displacement of carriage 6 over the two partial webs of stranded wires. As may be seen in FIG. 6B, downstream comb 21 is then disengaged and can be moved in such a way that the different individual conductors leaving bores 34 of unit 4 are separated from one another by the strips of the comb.

Figure 6A:
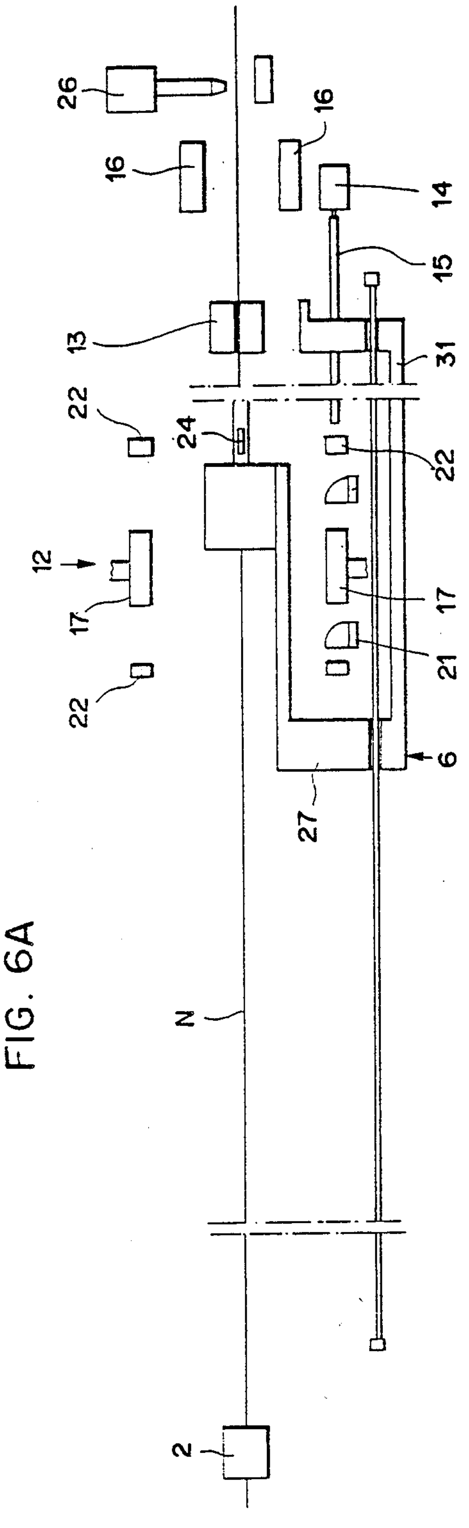
Figure 6B:
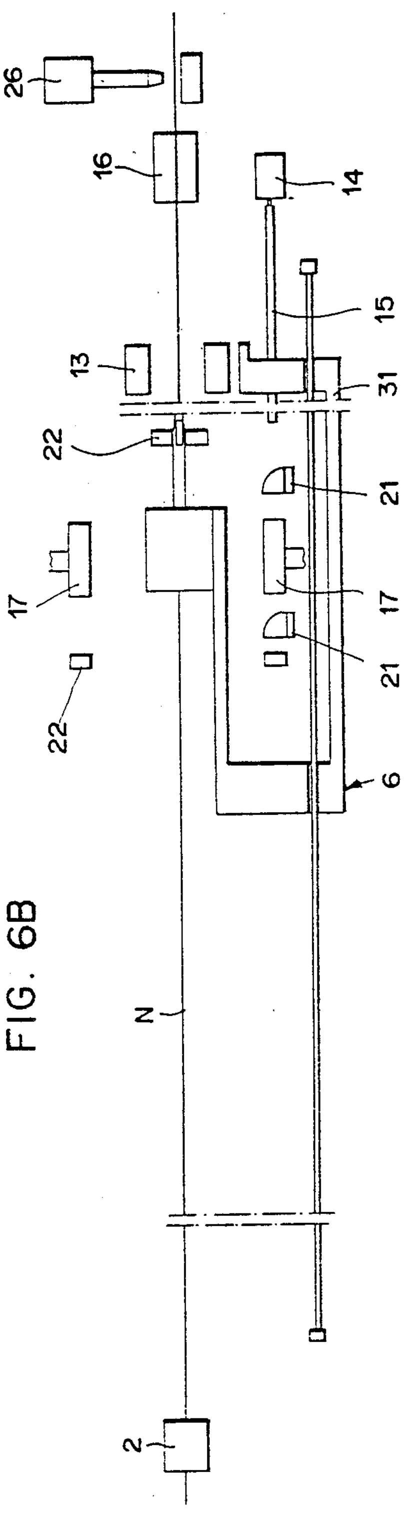
Figure 6C:
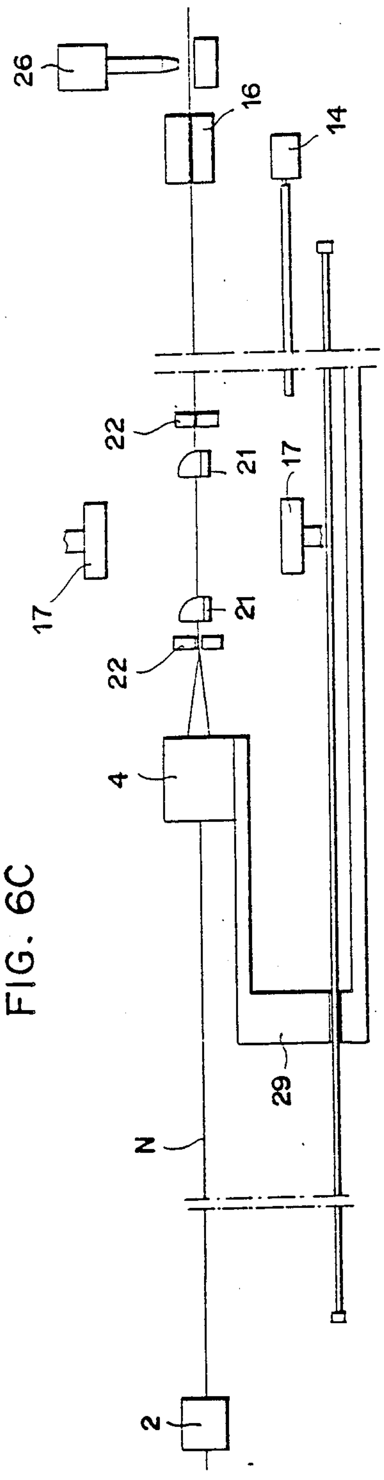
Figure 6D:
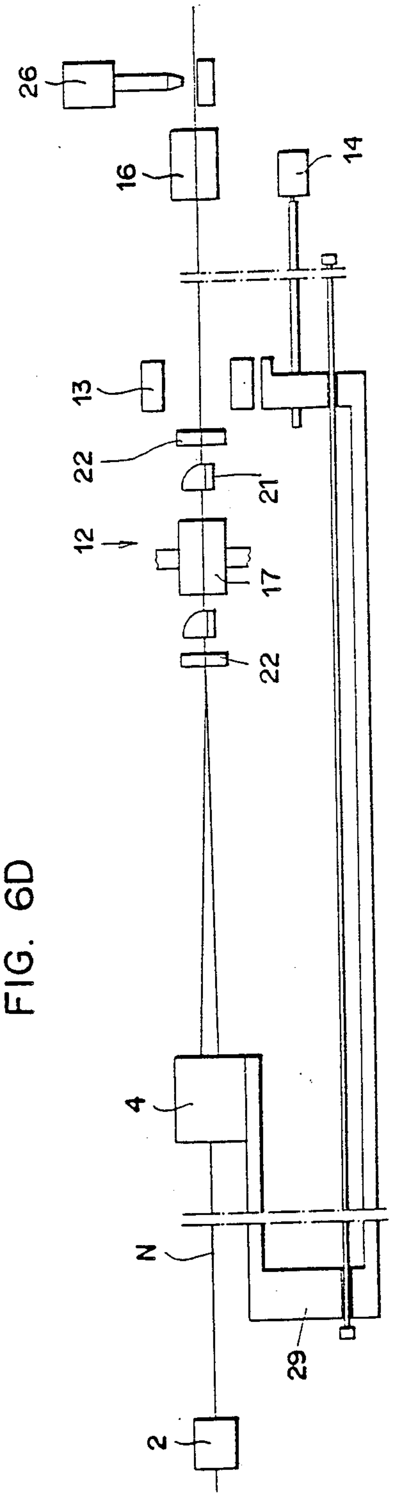
Figure 6E:
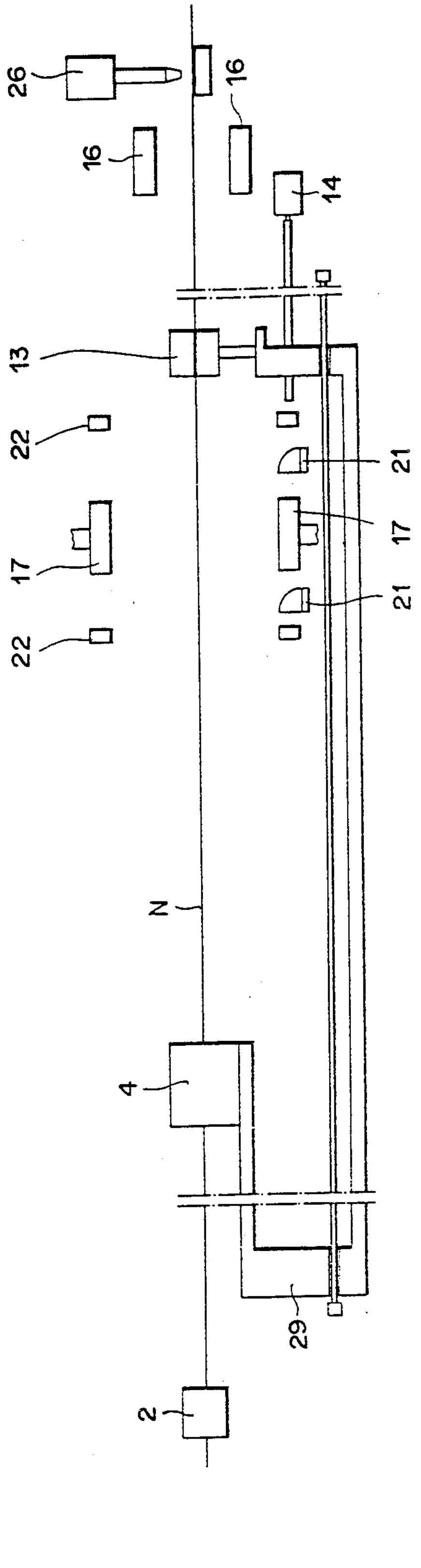

FIG. 6C shows the next stage: motor 14 is restarted so that carriage 6 moves upstream until base 29 is just upstream from the second clamp 22 which, as already mentioned, is upstream from bonding station 12. Thus, station 12 is completely disengaged. Upstream clamp 22 is then closed, so that between the two upstream and downstream clamps, there is a single web section in which all the conductors are straight, parallel, and equally spaced from one another. After upstream clamp 22 has been closed, upstream comb 21 can likewise be moved upward in order to space the conductors uniformly. Each of the conductors is then situated above one of the grooves 20 in lower plate 17 of the welding device and alos facing a shallower parallel groove in the underside of the upper welding plate.

It is at that moment that the welding operation intended to form a bonded segment can take place. As will be seen in FIG. 6D, the two plates 17 of bonding station 12 approach the web, which is held between the two clamps 22, and the welding operation takes place, giving the bonded segment the appearance depicted in FIGS. 7 and 10.

It is during the welding operation on the bonded segment n that device 26 deposits a drop of the interior marking product on the bonded segment n+1.

Once the welding operation has been carried out, or even during this operation and while the weld is cooling, motor 14 is restarted in order to move carriage 6 upstream, clamp 16 still remaining closed. During this operation, however, motor 5 is started, so that stranding heads 33 rotate in unit 4 and form in web N eleven pairs of conductors divided into two partial webs, the direction of twist of the various adjacent pairs alternating. Carriage 6 continues to move on until the required length is reached, this being determined by the fact that at the end of this movement, open clamp 13 mounted on the downstream part of carriage 6 is in immediate proximity to downstream clamp 22.

The operations for forming a bonded segment and the adjacent grouped segment are then terminated. The following stage, as may be seen in FIG. 6E, consists in opening clamps 16 and 22, retracting plates 17 of welding device 12, lowering the two combes 21, and closing clamp 13 on web N. Motor 5 is stopped, whereas motor 14, after a halt to allow opening of the aforementioned devices, is restarted in the direction which causes carriage 6 to advance downstream. The web as a whole is then moved since it is pulled along by clamp 13. Thus the bonded segment which has just been formed in bonding station 12 travels a distance corresponding to the sum of the lengths of a bonded segment and a grouped segment. In the course of these intermittent advancing movements, the successive segments of the web are withdrawn by equalizer 9, by means of which the speed of advance of main stranded 10, at the downstream end of the line, can be regulated.

Mechanism 10 as shown in FIG. 1 is a conventional strander having a reel 11 mounted in a cage rotating about its longitudinal axis and driven by a motor M. In a die situated at the upstream end of the mechanism, the pairs of stranded conductors, as well as the webs of bonded wires, are stranded into a cylindrical bunch owing to the rotation of the cage bearing reel 11. Mounted downstream from the die are two covering devices, each of which pays out a thread intended to bind the bunch and thus maintain its cylindrical cross-section.

Figure 7:
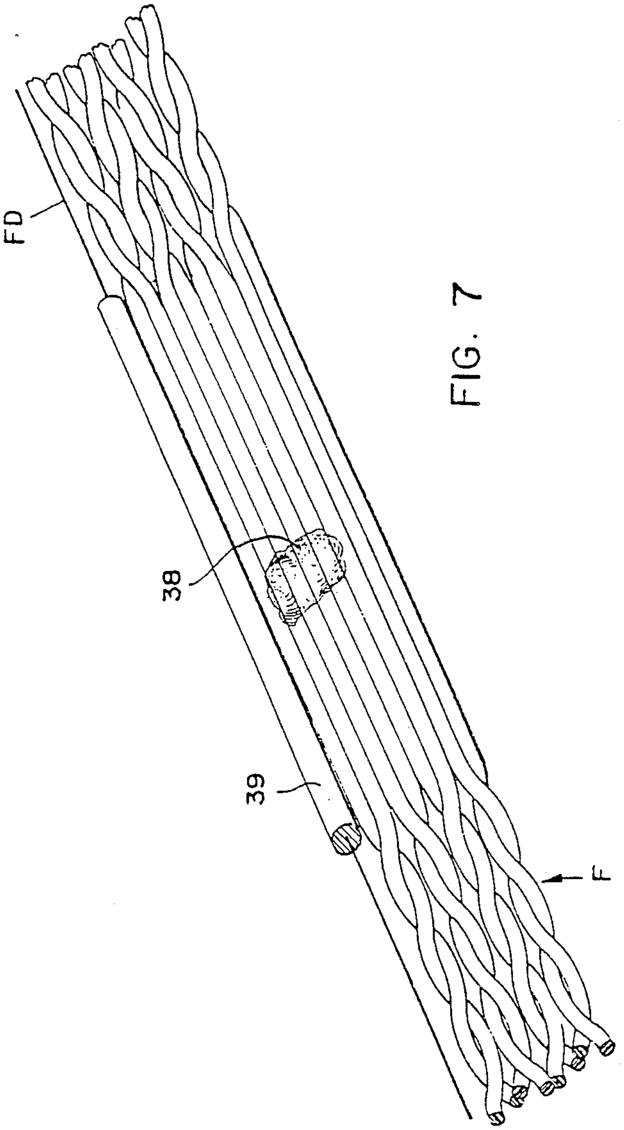
FIG. 7 is a perspective view on a larger scale of a length of cable after the welding operation.

As stated earlier, once reels 11 are full, they are transferred to an extrusion line where the cable receives its final jacket, possibly after having been further provided with a metal shield. After the extrusion operation, provision is made for a station to detect the location of the bonded segments owing to the emission produced by the interior marking substance. As concerns the marking operation which is carried out on the bonded segments at the downstream end of the path traveled by carriage 6, it has been found that it is extremely simple to perform this operation by delivering through a nozzle (FIG. 1) a drop of a solution containing a radioactive substance. The solvent, which may be relatively volatile, evaporates rapidly so that the drop of radioactive substance forms a localizing deposit 38 on the bonded segment (FIG. 7). After jacketing, an ordinary detector of radioactivity such as a Geiger or scintillation counter makes it easy to spot the locations of bonded segments and to mark them. Other methods may be used for depositing a localizing detector on the bonded segments. However, the use of a radioactive substance has the advantage that a material having a life on the order of a few hours may be used, so that any subsequent influence of the material is avoided.

It will further be noted that during the stranding operation carried out in machine 10, the bonded segments of the wire web N are folded together and thus take on a configuration which is virtually identical to that of the stranded pairs forming the grouped segments.

Figure 8:
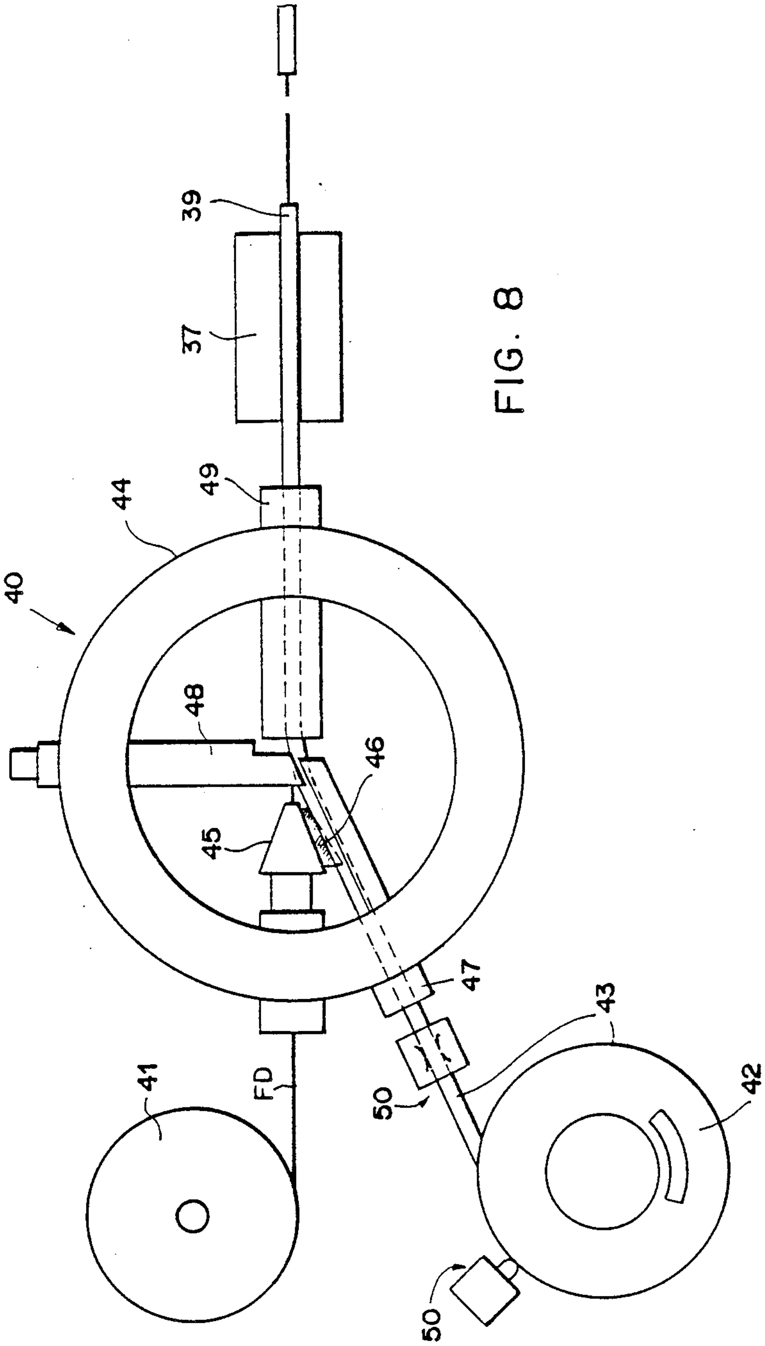
FIG. 8 is a top plan view on a larger scale of a detail of the installation of FIG. 1, showing the preparation of the ground conductor.
Figure 9:
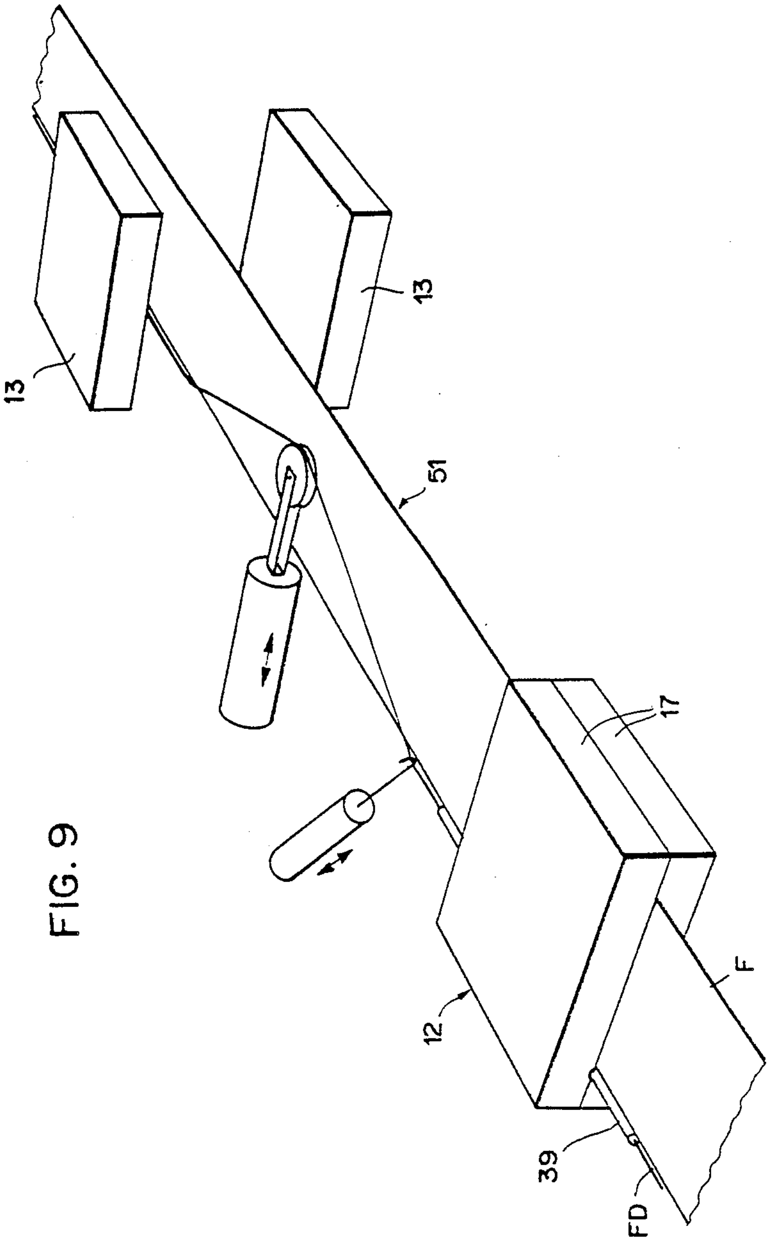
FIG. 9 is a diagrammatic perspective view showing a means of extending the length of the grounding.

FIGS. 8 and 9 illustrate a modification in which the cable is provided with a ground conductor FD. In certain cases, it is advantageous to have in the web of individual conductors a bare ground conductor in contact with the shield of the cable. Such a shield may take the form of a thin tape, e.g., of copper, which is wound around the strand like a thread covering, or of a longitudinal casing or a wire mesh. If it is desired to incorporate a ground conductor in the cable, this conductor is provided with sheathing portion 39 which are as long as or longer than the bonded segments and are placed in the latter, as depicted in FIG. 7. In this case, the conductor is paid out as a bare wire from a reel disposed on carriage 6 and joins the web of conductors passing through pairer 4.

FIG. 8 shows a reel 41 from which wire FD is unwound, an auxiliary reel 42 from which an empty sheath 43 is unwound, and an auxiliary apparatus 40 which the ground conductor FD enters before reaching pairer 4. The core diameter of sheath 43 is such that wire FD can slide within it. The essential component of apparatus 40 is a metal ring 44 which supports a radially positioned entry guide ending in a conical part 45 capable of guiding wire FD in a radial direction relative to ring 44. Disposed at an angle to guide part 45 is a likewise radial slideway 47 which is open on the side facing guide part 45 and serves to guide sheath 43. Conical part 45 further bears on the side facing slideway 47 a blade 46 intended to slit sheath 43 open longitudinally. The end of a part 48, disposed radially and at right angles to guide part 45, faces the end of slideway 47 and forces wire FD to enter sheath 43 through the slit held open by blade 46. The conductor thus sheathed passes into a guide tube 49, then into passage 37 of pairer 4. The course of operations is controlled in such a way that the sheathing portions 39 are placed around wire FD at distances corresponding to the length of the grouped segments of the cable. Each time knife 27 (FIG. 2) severs a sheath, the sheathing portion 39 situated downstream from knife 27 is closed by bonding station 12. As may be seen in FIG. 7, each sheathing portion 39 is placed along a bonded segment of the cable, and it is welded to the sheath of the adjacent conductor during the welding operation carried out at station 12.

By means of a device 50 shown in FIG. 8, exerting a braking action sychronized with the other functions, the sheathed length of the ground wire can be precisely fixed. Device 50 is actuated pneumatically and acts as a brake on reel 42. It ensures that the bare ground wire slips within sheath 43 upon the return of carriage 6 bearing downstream stranding unit 4, hence during the phase when the downstream pairer is in operation. Device 50 comprises two elements and acts simultaneously on sheath 43 and on reel 42 holding that sheath.

Immediately downstream from bonding station 12, a device 51 shown in FIG. 9 gives ground wire FD the necessary excess length and places it on the web of the proper grouped segment in order to ensure, after stranding, its contact with the shield to be put on later.

Figure 10A:
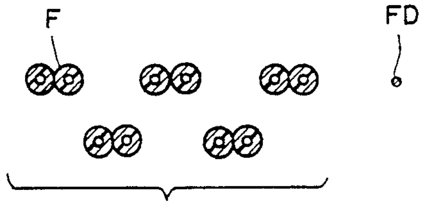
FIGS. 10*a–c* are diagrammatic sections illustrating the the various stages of manufacture of the cable.
Figure 10B:
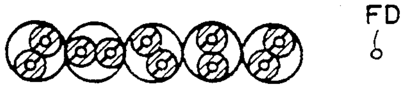
Figure 10C:
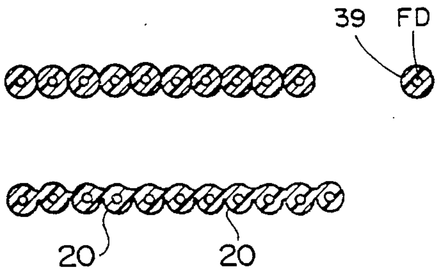

The various stages of the operations described above are summarized diagrammatically in FIG. 10. FIG. 10*a* shows wires F grouped in pairs and stranded for the length of the grouped segments, whereas for the length of the bonded segments, they are held side by side in the form of a flat web (FIG. 10*b*). Bare wire FD is provided with slit, then welded, sheathing portions 39. After welding of the bonded segments, the sheaths of the individual conductors are joined and form a coating mass having a cross-section which corresponds to the shape of grooves 20 in the plates 17 (FIG. 10*c*).

Figure 11A:
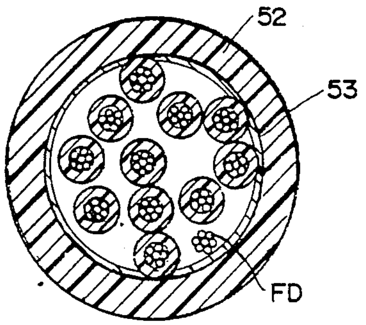
FIGS. 11*a–b* are sections illustrating grouped and bonded segments, respectively.
Figure 11B:
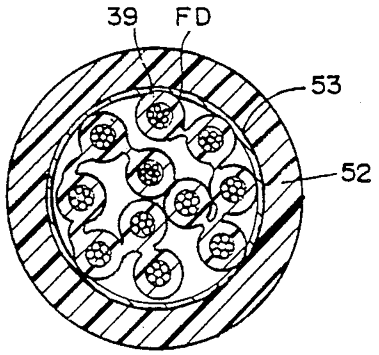

After stranding and jacketing of the cable, the pairs are collected within a jacket 52, as shown in FIG. 11. In FIG. 11*a* the pairs are separate, and ground conductor FD is situated at the periphery of the strand, in contact with a shield layer 53, whereas in FIG. 11*b*, the web of individual conductors is doubled up so as to occupy a cross-section similar to that of the separate pairs, and here conductor FD is isolated from shield 53 by the thickness of sheath 39. FIG. 11*a* is a section through a grouped segment and FIG. 11*b* through a bonded segment of a cable containing 36 conductors, plus the ground conductor.

FIG. 12 illustrates how the location of another bonded segment can be spotted by means of markings 54. As this location is indicated on jacket 52, it is easy to cut the cable in the middle of the marked section and to lay it bare over a distance slightly longer than the bonded segment. This segment may then be spread out as shown in the lower part of FIG. 12, whereupon all the conductors are presented in the form of a flat web and in the same order in each of these segments.

By means of the method and apparatus described above, a cable can be produced which is different from and has decisive advantages over prior art cables. Because the individual conductors are stranded in pairs, the cable can be used in fields and particular applications where the risk of crosstalk must be avoided; it is well known that in such cases, the usual flat cable in which the conductors are parallel is not suitable. However, along the grouped segments, the result of the stranding is that in many cases it is possible to do without a central core, the cable nonetheless having a round cross-section and a stiffness sufficient to enable it to be easily put in place. From the manufacturing standpoint, the alternate stranding of the different pairs necessitates that, in any case, the individual conductors be held at predetermined locations in order to permit successive reversals of the direction of stranding without causing unstranding. The necessary holding is combined according to the described method with the formation of the bonded segments, in which the conductors are disposed in a web in a predetermined order. Finally, manufacture can be carried out continuously, simply and rapidly.

What is claimed is:

1. A production-line installation for manufacturing electric cable having an assembly of individual conductors and a jacket, comprising:

payout means for unreeling a web of insulated conductors and a jacket, comprising:

payout means for unreeling a web of insulated conductors having each an insulating sheath, first and second stranding units having parallel axes, said second unit being situated downstream from said first unit, said units being arranged for stranding said conductors into a number of separate parallel strands over successive grouped segments of said web, having predetermined lengths, a welding station including a plurality of guiding and clamping means, for bonding said sheaths parallel to one another over successive intermediate bonded segments of said web having predetermined intermediate lengths and located between said grouped segments, and a main stranding device situated downstream from said welding station, for stranding said assembly.

2. The installation of claim 1, wherein said welding station is situated at a fixed location, further comprising a carriage reciprocating forward and backward relative to said welding station, said second stranding unit being mounted on said carriage, the forward movement of said carriage causing the web of conductors to advance, the backward movement of said carriage causing the formation of strands of a grouped segment, the web then being fixed and said welding station being in operation.

3. The installation of claim 1, wherein said guiding and clamping means are arranged to clamp the conductors at two locations spaced by a distance at least equal to said predetermined intermediate length and to keep them parallel in the same plane in the form of a web.

4. The installation of claim 1, further comprising an intermittent-sheathing station associated with said second stranding unit capable of preparing and positioning a bare conductor provided with lengths of sheathing and constituting a ground conductor.

5. The installation of claim 4, wherein said intermittent-sheathing station comprises first means for guiding an axially-moving empty sheath, a fixed blade associated with said first means for slitting and opening the sheath lengthwise, and second means for continuously introducing a bare conductor into the empty and opened sheath.

6. The installation of claim 5, further comprising means associated with said welding station for severing the sheath along a plane perpendicular to the axis thereof.

7. The installation of claim 1, further comprising means for causing a ground conductor associated with a grouped segment to be longer than said predetermined length of said grouped segments.

8. The installation of claim 7, further comprising means attached to said welding station and including a part for gripping the ground conductor downstream from a bonded segment and a part for providing an excess length of bare ground conductor by pulling it through said intermittent-sheathing station and placing it above the corresponding web of grouped conductors.

* * * * *